(12) United States Patent
Cho

(10) Patent No.: US 7,703,237 B2
(45) Date of Patent: Apr. 27, 2010

(54) APPARATUS FOR CULTIVATING CUCUMBER, EGGPLANT. ET AL.

(76) Inventor: Sung-rae Cho, Daerim insert Industrial 602-2, Gwansan-dong, Dukyang-gu, Goyang-si, Gyeonggi-do 412-804 (KR)

( * ) Notice: Subject to any disclaimer, the term of this patent is extended or adjusted under 35 U.S.C. 154(b) by 509 days.

(21) Appl. No.: 11/629,653

(22) PCT Filed: Jul. 25, 2005

(86) PCT No.: PCT/KR2005/002401

§ 371 (c)(1),
(2), (4) Date: Dec. 15, 2006

(87) PCT Pub. No.: WO2006/011737

PCT Pub. Date: Feb. 2, 2006

(65) Prior Publication Data

US 2007/0186464 A1    Aug. 16, 2007

(30) Foreign Application Priority Data

Jul. 29, 2004    (KR) .................. 20-2004-0021620 U

(51) Int. Cl.
*A01G 13/02* (2006.01)
(52) U.S. Cl. ............... 47/24.1; 47/2; 47/20.1; 47/29.1; 47/29.5; 47/66.3; 47/84; 206/1.5; 206/423; 220/326; 220/324; 220/835; 220/4.24; 220/682; 220/780; 220/784; 220/4.21; 220/4.23; 220/4.25
(58) Field of Classification Search ........... 47/2, 47/20.1, 24.1, 29.1, 29.5, 66.3, 84, 41.15; 150/118, 120, 123, 143; 220/326, 324, 835, 220/4.24, 4.21, 4.23, 4.25, 4.04, 682, 780, 220/784; 206/1.5, 423; 43/26; 383/42; *A01H 7/06*
See application file for complete search history.

(56) References Cited

U.S. PATENT DOCUMENTS

| | | | | | |
|---|---|---|---|---|---|
| 1,543,577 | A | * | 6/1925 | Kuhn | 292/75 |
| D161,156 | S | * | 12/1950 | Bienen | D3/324 |
| 3,295,713 | A | * | 1/1967 | Optner | 220/840 |
| 3,746,162 | A | * | 7/1973 | Bridges | 206/361 |

(Continued)

FOREIGN PATENT DOCUMENTS

JP     55-180360    * 12/1980

(Continued)

*Primary Examiner*—Andrea M Valenti
(74) *Attorney, Agent, or Firm*—Lowe Hauptman Ham & Berner, LLP

(57) ABSTRACT

An apparatus for cultivating a cucumber, eggplant or the like includes a fastening element for allowing an opened cover body to be fastened into a closed state or a closed cover body to be separated into an opened state by causing a catching protrusion opened along the longitudinal direction of the cover body, and a plurality of catching steps to allow the cover body to be coupled and fastened when catching steps are hooked on a catching protrusion, and a cover body distortion prevention projection formed protruding from the catching protrusion to fix opposite sides of each of the catching steps when each catching step is hooked on the catching protrusion. Cover body separation/opening supports are formed, respectively, on the top of each catching step and on the catching protrusion such that the fastened cover body can be unfastened and opened.

4 Claims, 6 Drawing Sheets

U.S. PATENT DOCUMENTS 5,341,926 A * 8/1994 Leben ..................... 206/307
2004/0002770 A1 * 1/2004 King et al. ............... 623/23.51

FOREIGN PATENT DOCUMENTS

| JP | 63-63356 | 4/1988 |
|---|---|---|
| JP | 64-009546 | 1/1989 |
| KR | 20-1992-0003721 U2 * | 3/1992 |
| KR | 20-19920003721 | 3/1992 |
| KR | 20-0199969 | 10/2000 |
| KR | 20-0199969 Y1 * | 10/2000 |
| KR | 20-0261929 | 1/2002 |

* cited by examiner

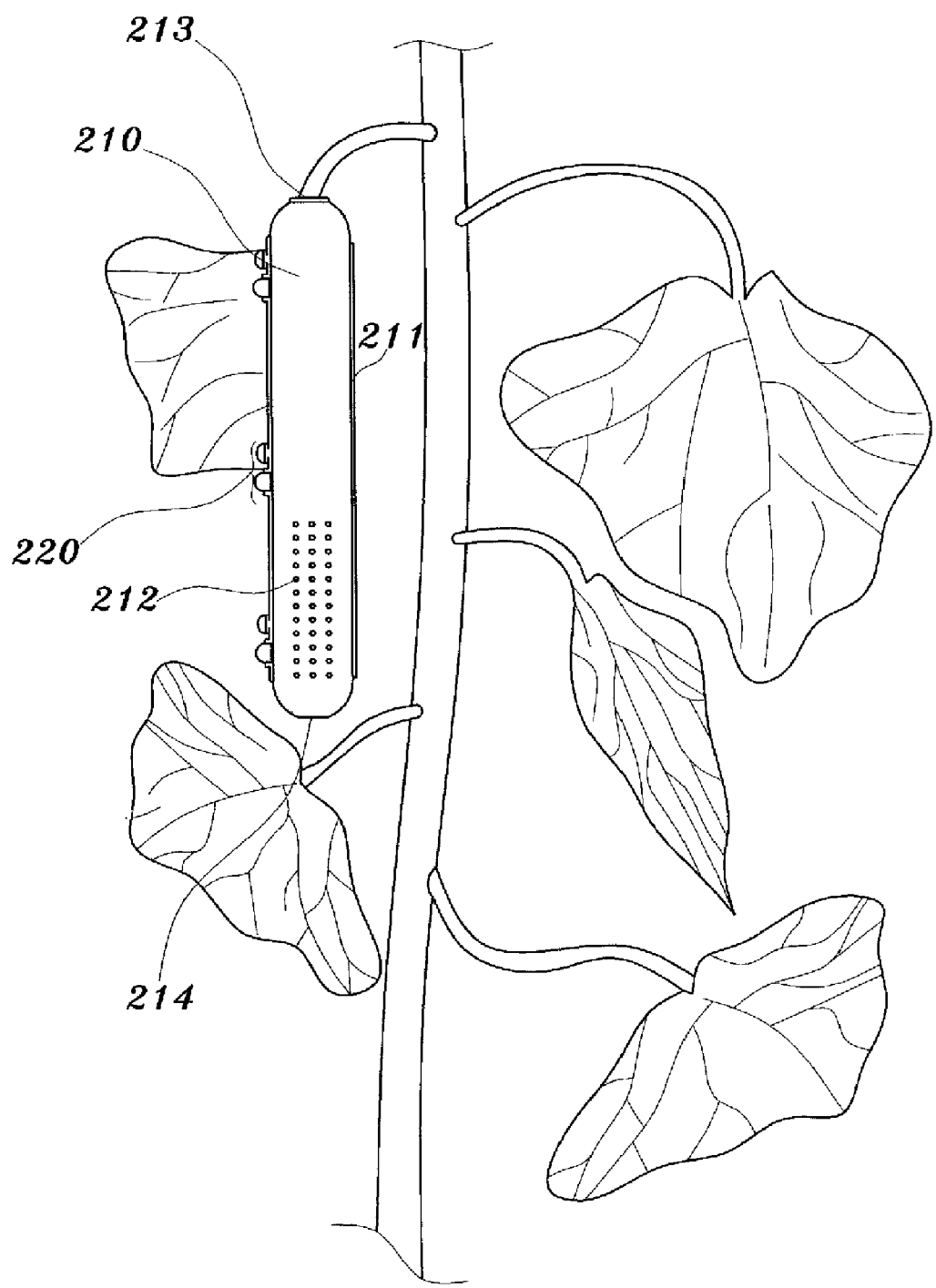
[Fig. 3]

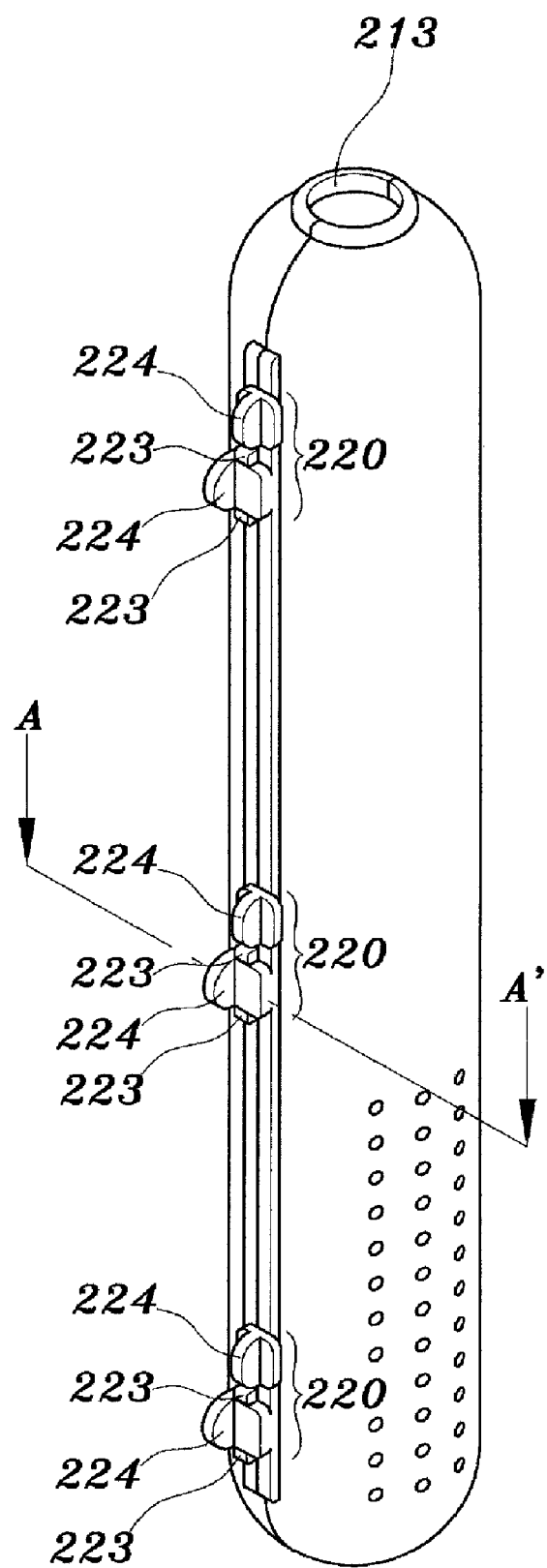
[Fig. 4]

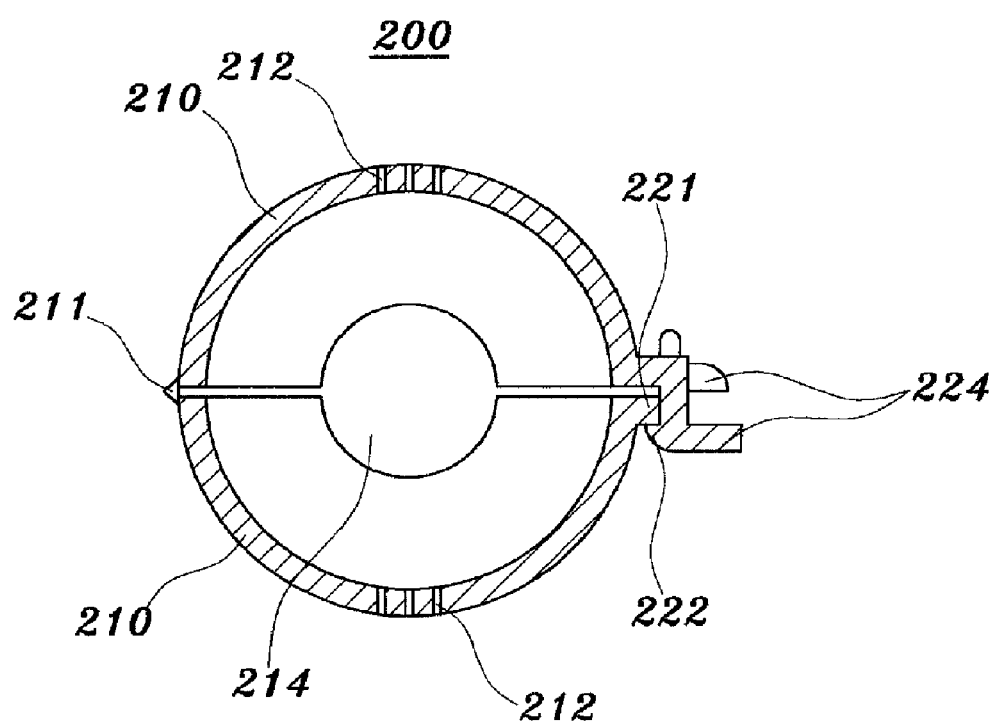
[Fig. 5]

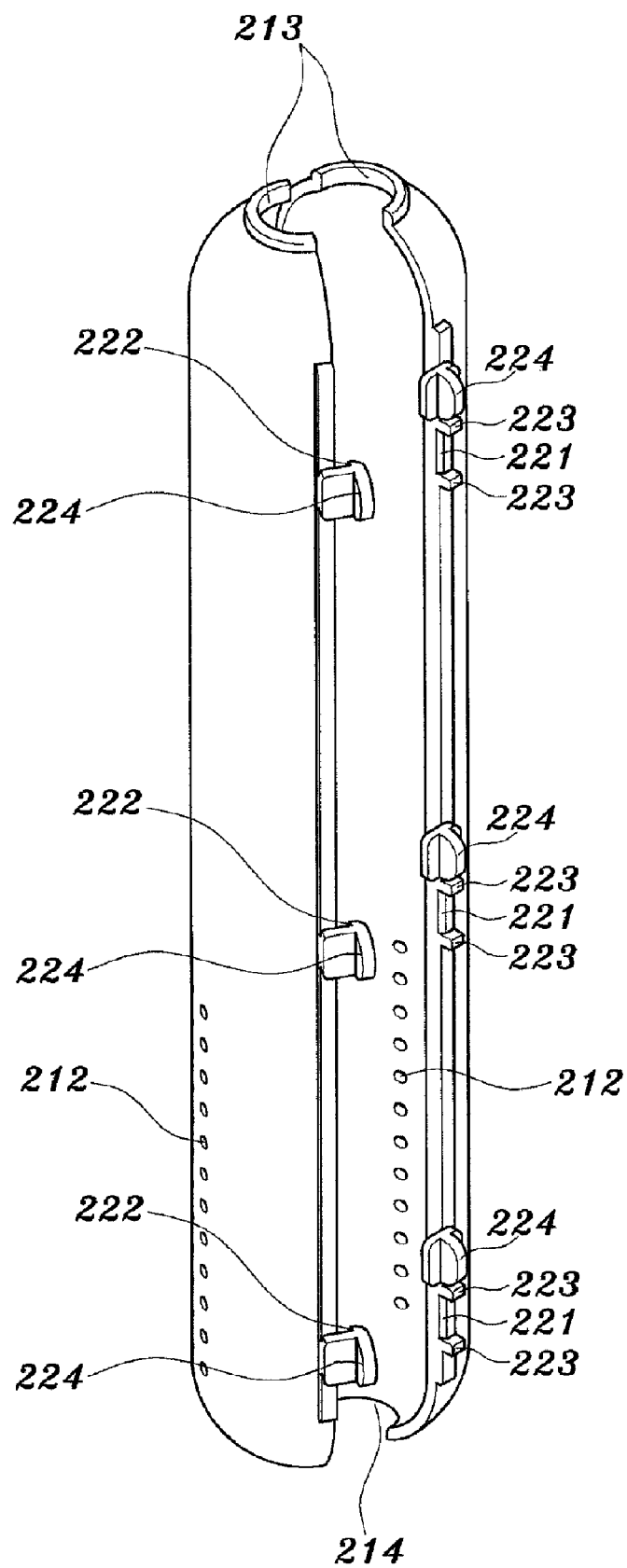
[Fig. 6]

APPARATUS FOR CULTIVATING CUCUMBER, EGGPLANT. ET AL.

CROSS REFERENCE TO RELATED APPLICATION

This application is the National Phase application of International Application No. PCT/KR2005/002401, filed Jul. 25, 2005, which designates the United States and was published in English. This application, in its entirety, is incorporated herein by reference.

TECHNICAL FIELD

The present invention relates to an apparatus for cultivating a cucumber, eggplant or the like, more particularly to, an apparatus for cultivating a cucumber, eggplant or the like wherein a cucumber, eggplant or the like can be cultivated at a predetermined shape and standard and agricultural chemicals can also be prevented from remaining directly on a surface of the cucumber, eggplant or the like, even though agricultural chemicals are sprayed to exterminate blight and harmful insects inhabiting leaves or stems thereof when a cucumber, eggplant or the like is cultivated.

BACKGROUND ART

A cucumber, eggplant or the like (hereinafter, referred to as cucumber) is generally cultivated in a greenhouse and then placed on the market throughout the year. A pre-determined amount of agricultural chemicals is sprayed to exterminate plight and harmful insects inhabiting stems and leaves of the cucumber with its length relatively greater than its width when the cucumber is cultivated.

In such a case, since agricultural chemicals are sprayed directly onto a surface of the cucumber, the agricultural chemicals also remain on the surface of the cucumber at a time when the cucumber is placed on the market. Therefore, there is a problem in that the agricultural chemicals are accumulated in and harmful to the human body if an individual eats the cucumber without cleaning the cucumber.

Further, cucumbers have a diameter of about 3 cm and tend to get curved, due to the influence of growing environments such as soil, moisture or sunshine, when it reaches a certain length. That is, the cucumbers grow to be different in view of their shapes. As a result, it is difficult to harvest cucumbers with uniform shapes and standards, and thus, the value of commodity can be lowered as a whole. Furthermore, any in-convenience may occur when storing, carrying or handling the cucumbers.

Accordingly, an apparatus for cultivating a cucumber in which a cover made of a general synthetic resin material is used to cover the cucumber has been currently employed such that an individual can eat the cucumber without fear by preventing agricultural chemicals from remaining directly on the surface of the cucumber and the value of commodity can also be improved by keeping the cucumber at a fixed shape and standard.

Such an example of an apparatus for cultivating a cucumber is disclosed in Korean Utility Model Publication No. 0261929. As shown in FIGS. 1 and 2, the apparatus 100 for cultivating a cucumber comprises first and second covers 110 and 120. The first and second covers 110 and 120 are hingedly connected to each other by means of a hinged portion 130 and include carved portions 116 and 126 with a cultivating place, cultivator or the like indicated on a side on one surface of the apparatus, air vent holes 111 and 121 formed on the other side of the surface of apparatus, stem holes 117 and 127 formed on one end of the apparatus, and flower leaf holes 118 and 128 formed on the other end opposite to the stem holes 117 and 127, respectively. The first cover 110 includes fastening plates 112 and 114 formed respectively with a fastening hook 113 and a fastening eye 115. The second cover 120 includes fastening plates 122 and 124 formed respectively with a fastening hook 123 and a fastening eye 125. The fastening hooks 113 and 123 and the fastening eyes 115 and 125 are formed on edges opposite to the hinged portion 130 to correspond to each other in a staggered manner. Therefore, the cucumber can be completely shielded against agricultural chemicals sprayed on the cucumber several times while cultivating the cucumber, thereby preventing the agricultural chemicals from remaining on the surface of the cucumber, so that an lower agricultural chemicals cucumber can be produced. In addition, the cucumber can be cultivated within a main body of the apparatus 100 constructed in the form of a single case by the fastening plates 112, 124, 122 and 114.

However, the conventional apparatus 100 for cultivating a cucumber may have a problem in that when the cucumber continuously grows beyond the size of the main body thereof constructed in the form of a case by means of the first and second covers 110 and 120, the cucumber applies an certain expansion pressure to the first and second covers 110 and 120.

In such a case, since the first and second covers 110 and 120 are kept at a firmly fastened state by means of the fastening hooks 113 and 123 and the fastening eyes 113 and 123, a force for suppressing the expansion pressure of the cucumber will be exerted again onto the cucumber. Therefore, there is another problem in that the value of commodity is lowered due to the shape deformation of the cucumber itself.

In addition, since the conventional apparatus for cultivating a cucumber cannot indicate a period of harvest, a cultivator should visually determine one by one the period of harvest. Therefore, there is a further problem in that it is a burden on a busy peasant as well as the value of commodity is also lowered due to missing of the period of harvest.

Furthermore, since the expansion pressure of the cucumber applied to the main body is not uniform, the other portions than a fastening portion may be deformed in a state where the first and second covers 110 and 120 do not withstand the non-uniform expansion pressure applied thereto. Therefore, there is a still further problem in that the main body cannot be used again due to its failure.

That is, if a cucumber grows beyond a certain size or thickness, the expansion pressure is applied to the main body up and down or from side to side. In such a case, since a direction in which a cucumber grows is not regular, the expansion pressure applied to the main body is also not uniform. Therefore, since the main body may be distorted when the cucumber grows beyond a certain size or thickness, it is difficult to reuse the main body and the shape of cucumber growing in the main body is not uniform.

Moreover, the air vent holes 111 and 121 are formed in the first and second covers 110 and 120 in order to prevent the cucumber from being rotten due to the inhabitation of molds or ticks while the cucumber grows in the main body of the apparatus.

However, it is still unsatisfactory and thus there is a need for further supplement.

SUMMARY

Accordingly, the present invention is conceived to solve the aforementioned problems in the prior art. An object of the present invention is to provide an apparatus for cultivating a cucumber, eggplant or the like wherein the apparatus can be easily assembled or disassembled and a cover body is prevented from being distorted due to a non-uniform expansion pressure applied thereto during the growth of the cucumber, eggplant or the like, thereby reusing the apparatus, reducing a working burden of a peasant, and ensuring an uniform shape and standard of the cucumber, eggplant or the like to improve the value of commodity.

Another object of the present invention is to provide an apparatus for cultivating a cucumber, eggplant or the like, wherein the cover of the apparatus is made of a material obtained by mixing an antibacterial bioceramic material with a general synthetic resin material, in order to effectively suppress or prevent the cucumber, eggplant or the like from being rotten due to flight and harmful insects such as molds or ticks during the growth of the cucumber, eggplant or the like.

According to an aspect of the present invention for achieving the above objects, there is provided an apparatus for cultivating a cucumber, eggplant or the like, comprising: a cover body which has a space for receiving the cucumber, eggplant or the like and allowing the cucumber, eggplant or the like to grow into a certain shape, and is cut in halves in a longitudinal direction such that the two halves are connected at one side thereof by means of an elastic support with an outward elastic force and the other side thereof is kept in an opened state; a plurality of air vent holes formed in the cover body; a stem hole formed at one end of the cover body; a leaf hole formed at the other end of the cover body; a fastening means which is formed at the open other side of the cover body to allow the opened cover body to be fastened into a closed state or the closed cover body to be separated into an opened state; and a cover body distortion prevention projection which is formed to wrap and fix opposite sides of the fastening means to prevent the cover body from being distorted due to an expansion pressure produced by the growing cucumber, eggplant or the like and then applied to the cover body, wherein the fastening means includes a catching protrusion formed at the other side of one half of the cover body opened along the longitudinal direction of the cover body, and a plurality of catching steps formed on the other side of the other half of the cover body to allow the cover body to be coupled and fastened when the catching steps are hooked on the catching protrusion, and the cover body distortion prevention projection formed to protrude from the catching protrusion and to wrap and fix opposite sides of each of the catching steps when each catching step is hooked on the catching protrusion.

Cover body separation/opening supports may be formed, respectively, on the top of each catching step and on the catching projection at the side of the cover body distortion prevention projection such that the fastened cover body can be easily unfastened and opened.

Preferably, the catching protrusion is inclined downward toward the interior of the cover body to be easily coupled to the catching steps.

More preferably, the apparatus is manufactured of a material obtained by mixing 1 to 5% of an antibacterial bioceramic material with a general synthetic resin material.

Since an apparatus for cultivating a cucumber, eggplant or the like according to the present invention so configured can prevent a cover body from being distorted due to a non-uniform expansion pressure that is generated due to the growth of the cucumber, eggplant or the like and then applied to the cover body, the cultivating apparatus can be reused.

Further, the cultivator can check at any time a state where the cucumber has grown since the cultivating apparatus of the present invention is easily fastened or separated. In addition, when a certain expansion pressure of the cucumber is applied to the apparatus, the apparatus is directly opened such that the period of harvest for cucumber can be easily checked. Therefore, a burden of a peasant can be reduced. Furthermore, since uniform cucumbers, eggplants or the like can be obtained, the value of commodity can be enhanced and subsequent works can also be conveniently achieved.

Moreover, since the cultivating apparatus of the present invention is manufactured of a material obtained by mixing an antibacterial bioceramic material with a general synthetic resin material, the cucumber, eggplant or the like can be prevented from being rotten due to the plight and harmful insects such as molds or ticks while it is cultivated in the cultivating apparatus.

BRIEF DESCRIPTION OF THE DRAWINGS

FIG. 3 is a view showing a state where an apparatus for cultivating a cucumber, eggplant or the like according to an embodiment of the present invention is utilized.

FIG. 4 is a perspective view showing a state where the cultivating apparatus of the present invention is closed.

FIG. 5 is a sectional view of the apparatus taken along line A-A shown in FIG. 4.

FIG. 6 is a perspective view of the apparatus of the present invention is opened.

Figure 1:
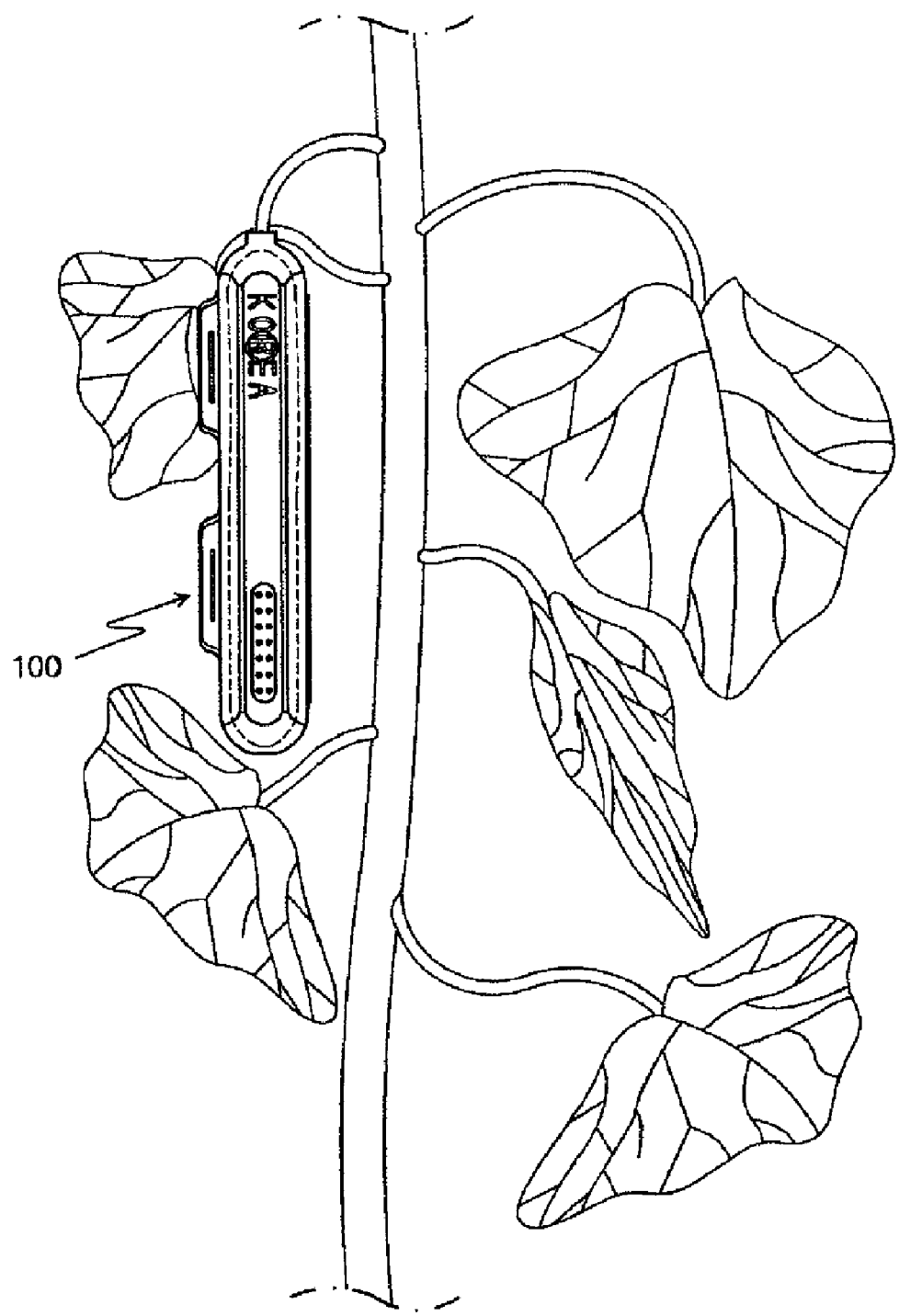
FIG. 1 is a view showing a state where a conventional apparatus for cultivating a cucumber is utilized.
Figure 2:
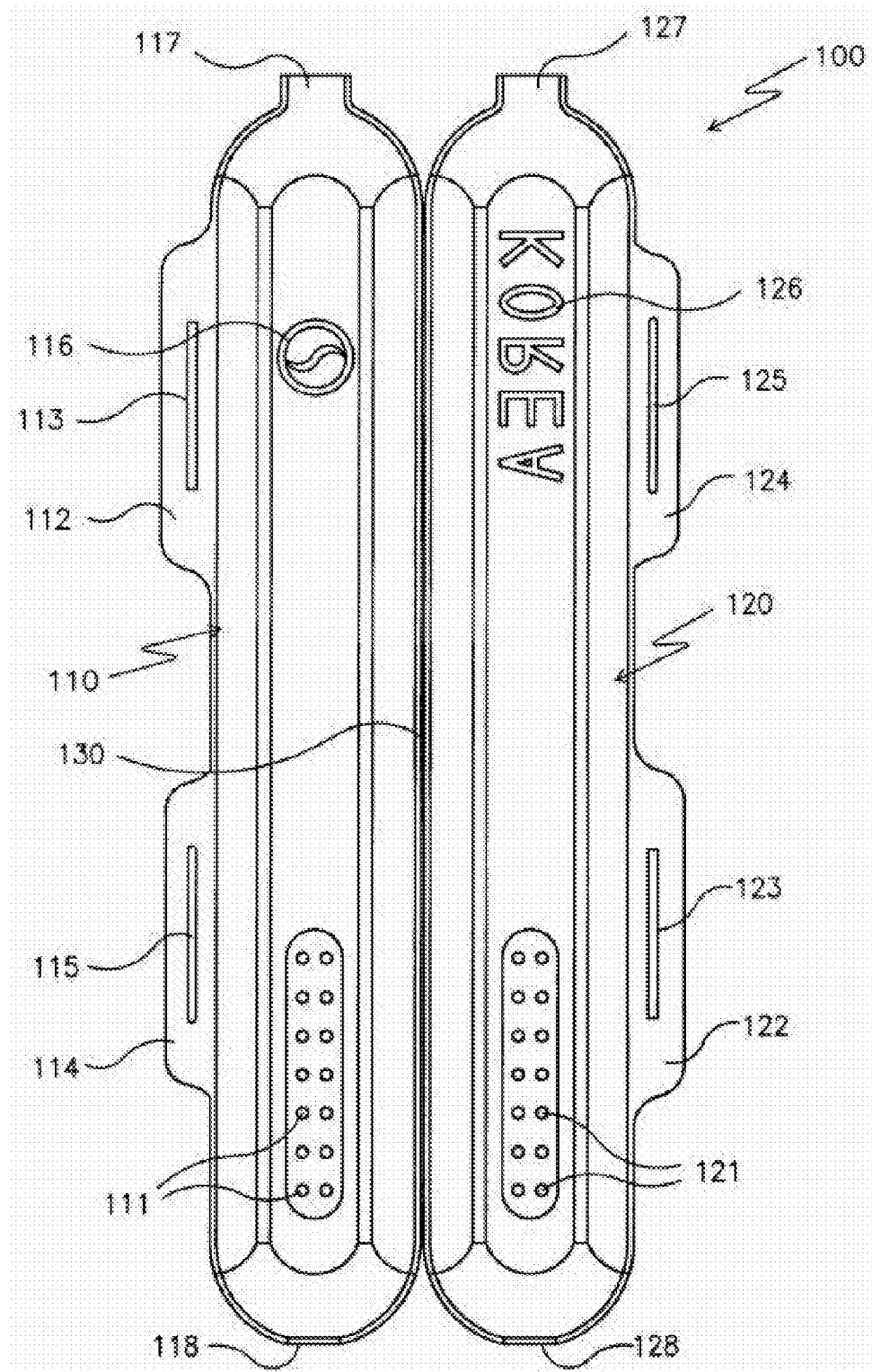
FIG. 2 is a view showing a state where the apparatus of FIG. 1 is opened.

EXPLANATION OF REFERENCE NUMERALS
FOR DESIGNATING MAIN COMPONENTS IN
THE DRAWINGS

100: Apparatus for cultivating cucumber according to a prior art
110: First cover 120: Second cover
111, 121, 212: Air vent holes 112, 114, 122, 124: Fastening plates
113, 123: Fastening hooks 115, 125: Fastening eyes
116, 126: Carved portions 117, 127, 213: Stem holes
118, 128, 214: Leaf holes 130: Hinged portion
200: Apparatus for cultivating a cucumber, eggplant or the like according to an embodiment of the present invention
210: Cover body 211: Elastic support
220: Fastening means 221: Catching protrusion
222: Catching steps
223: Cover body distortion prevention projection
224: Cover separation/opening supports

DETAILED DESCRIPTION

FIG. 3 is a view showing a state where an apparatus for cultivating a cucumber, eggplant or the like according to an embodiment of the present invention is utilized, FIG. 4 is a perspective view showing a state where the cultivating apparatus of the present invention is closed, FIG. 5 is a sectional view of the apparatus taken along line A-A shown in FIG. 4, and FIG. 6 is a perspective view of the cultivating apparatus of the present invention is opened.

An apparatus 200 for cultivating a cucumber, eggplant or the like according to an embodiment of the present invention comprises a cover body 210 of which a side can be kept to be opened along a longitudinal direction thereof, and a fastening means 220 which allows the opened cover body 210 to be fastened into a closed state or the closed cover body to be unfastened into an opened state.

The cover body 210 is cut in halves in a longitudinal direction, and the two halves of the cover body are then connected at only one cut side of the cover body by means of an elastic support 211 with an outward elastic force such that the other cut side can be kept in an opened state. At this time, if the opened side of the cover body 210 is fastened by means of the fastening means 220, a space corresponding to an external shape of the cucumber growing in the cover body is formed.

Further, a plurality of air vent holes 212 are formed in the cover body 210 such that air ventilation can be smoothly made between the interior and exterior of the cover body having the space in which the cucumber is received and grows into a certain shape.

In addition, the cover body 210 is formed with a stem hole 213, through which a stem of the cucumber can pass, at one end thereof and a flower leaf hole 214 at the other hand thereof.

The fastening means 220 is formed at the other side of the cover body 210 opened along the longitudinal direction of the cover body and performs the functions of coupling and fastening the opened halves of the cover body 210 and of separating and opening the closed halves of the cover body 210.

First, in order to couple and fasten the opened sides of the halves of the cover body 210 using the fastening means 220, a catching protrusion 221 extending continuously in the longitudinal direction is formed on the other side of one half of the cover body 210.

Further, a plurality of catching steps 222 are formed on the other side of the other half of the cover body 210 at regular intervals so as to allow the opened sides of the cover body 210 to be coupled and fastened when the catching steps 222 are hooked on the catching protrusion 221.

The catching protrusion 221 is inclined downward toward the interior of the cover body 210 such that the catching step 222 can be easily coupled and fastened to the catching protrusion 221.

Here, as a main feature of the present invention, cover body distortion prevention projections 223 for preventing the cover body 210 from being distorted due to an expansion pressure applied to the cover body 210 while the cucumber grows are explained. In order to prevent the fastened cover body 210 from being distorted, the cover body distortion prevention projections 223 are formed to protrude from the catching protrusion 221 and to wrap and fix opposite sides of each of the catching steps 222 when each catching step 222 is hooked on the catching protrusion 221.

Next, in order to unfasten and open the cover body coupled and fastened by means of the fastening means 220, a pair of cover body separation/opening supports 224 are formed, respectively, on the top of each catching step 222 and on the catching projection at the side of the cover body distortion prevention projection adjacent to the corresponding catching step 222 such that the fastened cover body 210 can be easily unfastened and opened by using a finger or the like.

If a certain force is applied to the cover body separation/opening supports 224 by using the finger or the like, the catching step 222 of the fastening means can be slightly raised upward and easily separated from the catching projection 221, so that the fastened or closed cover body can be unfastened and opened.

Furthermore, the apparatus 200 for cultivating a cucumber, eggplant or the like according to the embodiment of the present invention is manufactured of a material obtained by properly mixing 1 to 5% of a general antibacterial bioceramic material with a general synthetic resin material such as polyethylene or polypropylene and is si-multaneously formed with the air vent holes 212. Therefore, the cultivating apparatus 200 of the present invention can effectively prevent the cucumber, eggplant or the like from being rotten due to molds or ticks inhabiting the cover body when it is used for cultivating a cucumber, eggplant or the like.

A process of utilizing the apparatus 200 for cultivating a cucumber, eggplant or the like according to the embodiment of the present invention so configured will be explained as follows.

First, in a state where the other side of the cover body 210 is opened, a flowered portion of the cucumber is placed into the cover body and the stem of cucumber is also placed through the stem hole 213. Then, if a certain force is applied to close the cover body 210, the catching steps 222 are hooked on and fastened to the catching protrusion 221 such that the cover body 210 is kept at a fastened state.

Here, the catching steps 222 can be easily hooked on the catching protrusion 221 because the catching protrusion 221 is inclined downward toward the interior of the cover body 210.

Therefore, the space in which the cucumber is received and grows into a certain shape is defined within the cover body 210.

In such a state, the cucumber placed in the cover body 210 grows gradually in accordance with the space of the inner space defined by the cover body 210.

At this time, air circulates in the inner space of the cover body 210 through the air vent holes 212 and the general mixed antibacterial bioceramic material prevents molds etc. from being inhabiting the interior of the cover body, so that the cucumber cannot be damaged, i.e. rotten or decayed.

Since the elastic support 211 connecting sides of the halves of the cover body 210 has an elastic force for outward widening the gap defined at the other side of the cover body 210, the catching steps 222 hooked on the catching protrusion 221 tends to be separated at the time when the cucumber cultivated in the cover body 210 grows to be tightly filled in the cover body 210, so that the elastic support 211 can be easily widened outward.

Therefore, a cultivator can easily determine the period of harvest for the cucumber and then harvest the cultivated cucumber. Thus, since the harvested cucumber is uniform in its shape, the value of commodity is improved. Further, since the cucumber can be packaged and supplied to the consumers without any additional processes of selecting the cucumbers accordance their sizes or the like, additional installation expenses related to the production of cucumber can be saved and the workability can also be improved.

In addition, the non-uniform expansion pressure applied to the cover body 210 due to the growth of cucumber can be effectively suppressed by the cover body distortion prevention projections 223 and the shape of the cucumber can thus be maintained uniform until the catching steps 222 are unhooked and separated from the catching protrusion 221. Therefore, the apparatus for cultivating a cucumber, eggplant or the like can be prevented from being broken due to the expansion pressure of the growing cucumber, eggplant or like and thus be repeatedly reused.

Furthermore, the pair of cover body separation/opening supports 224 are formed, respectively, on the top of each catching step 222 and on the catching protrusion 221 at the side of the cover body distortion prevention projection 223 adjacent to the cor-responding catching step 222. Therefore, if a user applies predetermined forces to the cover body separation/opening supports using a finger or the like, the fastened cover body 210 can be easily unfastened and opened, so that the user can easily check a state where the cucumber has grown.

The present invention is not limited to the embodiment described as above and can be variously modified within a scope of the present invention defined in the claims. Such a modification or change should be construed as falling within the scope of the present invention.

For example, although it has been described in this embodiment that a cucumber, eggplant or the like is cultivated, it should be considered that all objects such as a pumpkin with its length relatively greater than its width can be cultivated by using the cultivating apparatus of the present invention. That is, the apparatus for cultivating the objects of which their external shapes are merely different from one another can fall within the scope of the present invention.

Since an apparatus for cultivating a cucumber, eggplant or the like according to the present invention so configured can prevent a cover body from being distorted due to a non-uniform expansion pressure that is generated due to the growth of the cucumber, eggplant or the like and then applied to the cover body, the cultivating apparatus can be reused.

The invention claimed is:

1. An apparatus for cultivating an object, comprising:
 a cover body having a space for receiving the object, the cover body being cut in halves in a longitudinal direction such that the two halves are connected along a closed side and an openable side of the cover body,
 wherein the first and second halves are connected by an elastic support, and said first and second halves is kept in an opened state along the openable side by the elastic support with an outward elastic force;
 a plurality of air vent holes formed in the cover body;
 a stem hole formed at one end of the cover body;
 a leaf hole formed at the other end of the cover body;
 at least a fastening element formed at the openable side of the cover body for allowing the opened cover body to be fastened into a closed state or the closed cover body to be separated into an opened state;
 wherein each of the fastening element includes
  a catching protrusion formed at the openable side of the first half along the longitudinal direction of the cover body, and
  a catching step formed on the openable side of the second half to allow the first and second halves to be coupled and fastened when the catching step is hooked on the catching protrusion, and
 at least a pair of a cover body distortion prevention projections, wherein the cover body distortion prevention projections protrude from the catching protrusion to wrap and fix opposite sides of the respective catching step when the respective catching step is hooked on the catching protrusion for preventing the cover body from being distorted due to an expansion pressure produced by the object and then applied to the cover body, cover body separation/opening supports for unfastening and opening the cover body when the cover body is fastened, wherein said cover body separation/opening supports includes a first separation/opening support protruding from a top surface of each of said catching steps; and a second separation/opening support protruding from a top surface of the catching protrusion at a side of the cover body distortion prevention projections and longitudinally adjacent the corresponding catching step when in a closed state.

2. The apparatus as claimed in claim 1, wherein the catching protrusion is inclined downward toward an interior of the cover body to be coupled to the respective catching step.

3. The apparatus as claimed in claim 1, wherein the apparatus is manufactured of a material obtained by mixing 1 to 5% of an antibacterial bioceramic material with a general synthetic resin material.

4. The apparatus as claimed in claim 1, wherein, in the closed state, said first and second separation/opening supports directly contact the cover body distortion prevention projections, and the second separation/opening support covers the catching protrusion and being sandwiched between the cover body distortion prevention projections in the longitudinal direction.

* * * * *